UNITED STATES PATENT OFFICE 2,666,064

MANUFACTURE OF 3-(α-PHENYL-β-ACETYL-ETHYL)-4-HYDROXYCOUMARIN

Donald F. Starr, Montclair, and Karl K. Haber, Jersey City, N. J., assignors to S. B. Penick & Company, Incorporated, New York, N. Y., a corporation of Delaware No Drawing. Application January 25, 1952, Serial No. 268,350

15 Claims. (Cl. 260—343.2)

Our invention relates to an improvement in the manufacture of 3-(α-phenyl-β-acetylethyl)-4-hydroxycoumarin, a highly effective rodenticide known in the trade as "Warfarin," by the condensation of 4-hydroxycoumarin with benzalacetone.

The said condensation has been reported in ethanol with an acid or base catalyst, such as sodium ethylate, hydrochloric acid or piperidine, yielding a mixture of condensation products. In pyridine without a catalyst at refluxing temperatures the desired condensation product is reported in yields of 40-44%. When water was used instead of pyridine and no catalyst, the yield is reported as about 48% (M. A. Stahmann, M. Ikawa and K. P. Link, Journal of the American Chemical Society 66, 902, 1944, and U. S. Patent 2,427,578). Condensation under reflux in dioxane containing piperidine as a catalyst is reported to give a yield of 67% (M. Seidman, D. N. Robertson and K. P. Link, Journal of the American Chemical Society 72, 5193, 1950).

We have now invented an improvement in the said condensation procedure which includes conducting the reaction by heating in water in the presence of a catalytic amount of ammonia or an organic amine, with the result that much better yields of the condensation product are obtained than by the previous methods. We have found that under these conditions a wide variety of organic amines is catalytically active in our process at different catalytic levels. These include primary, secondary and tertiary aliphatic amines, secondary and tertiary cyclic amines, and aromatic amines. We have tested them at catalytic levels selected to give optimum yields of the condensation product, within the range of from 0.5 to 150 moles of catalyst per 100 moles (mole percent) of 4-hydroxycoumarin.

The reaction is generally carried out under slightly acid conditions at reflux temperature. However, lower temperatures, for instance mild heating, will give satisfactory results.

Amounts as low as 0.01 mole percent of catalyst will be operable in our method. When up to 15% of catalyst is used in the condensation, there generally results a solid crude product which can readily be suspended as a wet filter cake in a hydrocarbon solvent such as benzol, toluol or one of the common chlorinated hydrocarbons, benzol being preferred. The suspension is refluxed, say for about one hour, the solid material filtered off after cooling, dissolved in caustic alkali such as a 5% sodium hydroxide solution, the solution washed with a chlorinated hydrocarbon solvent such as chloroform, carbon tetrachloride, ethylene dichloride, and tri- or tetrachloro ethylene, preferably carbon tetrachloride, and then acidified with an inorganic acid such as hydrochloric acid or sulfuric acid to precipitate the pure "Warfarin" which is filtered off, thoroughly washed with water and dried.

The procedure is modified when amounts of catalysts above 15 mole percent are used, since a semi-plastic condensation product is obtained which usually fails to precipitate or crystallize when suspended and cooled in benzol. The benzol mixture is extracted with dilute hydrochloric acid or sulfuric acid whereupon the "Warfarin" precipitates and can be carried through the remainder of the purification procedure described above.

The final product is a white to pale tan powder, tasteless and odorless, soluble in dioxane and acetone, slightly soluble in benzene and alcohol and practically insoluble in water, but soluble in sodium hydroxide solution. It melts at 159–164° C. (corrected).

The following examples demonstrate in detail the catalytic effectiveness of a representative group of these organic amines and of ammonia at various levels of catalytic activity.

*Example 1.—7.9 mole triethylamine*

Into a one-liter two-neck flask, equipped with reflux condenser and stirrer, are charged 50 grams (0.304 moles) of 4-hydroxycoumarin (M. P. 212–214° C.), 50 grams (0.342 moles) of benzalacetone (congealing point 37–38° C.), 350 cc. of water and 3.4 cc. (0.024 mole) of triethylamine. The mix is heated to boiling with stirring and maintained at reflux for 1–2 hours during which period a heavy precipitate forms. Refluxing is continued for one additional hour with vigorous agitation, and the reaction mixture is then cooled to room temperature. The solid crude product is separated by filtration, rinsed with fresh water, and sucked as dry as possible. The crude solids are suspended in 200 cc. of benzol, refluxed with stirring for 30–45 minutes, cooled, filtered, washed on the filter with fresh benzol and sucked as dry as possible. The solids are dissolved at room temperature in 400 cc. of 5% sodium hydroxide solution (any free benzol is decanted off the surface) and the solution is washed three times as follows: with (1) 200 cc. of carbon tetrachloride, (2) 100 cc. of carbon tetrachloride, and (3) 100 cc. of carbon tetrachloride. The washed alkaline solution is now acidified with strong hydrochloric acid to pH 1-3 whereupon the final product precipitates out. It is filtered off, washed free of chlorides with water and dried.

Yield: 80 grams or 85% of theory based upon 4-hydroxycoumarin.

The initial aqueous reaction liquor from which the crude product has been separated is acidified to pH 1-2 with hydrochloric acid and 2.2 grams (4.4% by weight) of unreacted 4-hydroxycoumarin is thereby recovered.

*Example 2.—5.0 mole per cent ammonia*

Into a one-liter flask equipped with stirrer and reflux condenser are charged 50 grams (0.304 mole) of 4-hydroxycoumarin (M. P. 212-214° C.), 50 grams (0.342 mole) of benzalacetone (congealing point 37-38° C.), 350 ml. of water and 1.09 ml. (0.0152 mole) of 28% ammonium hydroxide (U. S. P.). The mixture is treated as in Example 1.

Yield: 69 grams or 75% of theory based upon 4-hydroxycoumarin.

*Example 3.—50 mole per cent triethylamine*

Into a one-liter flask equipped with stirrer and reflux condenser are charged 50 grams (0.304 mole) of 4-hydroxycoumarin (M. P. 212-214° C.), 50 grams (0.342 mole) of benzalacetone (congealing point 37-38° C.), 350 ml. of water and 15.5 grams (0.152 mole) of triethylamine. The mixture is refluxed for 5 hours, cooled to 5-10° C. overnight and the supernatant aqueous layer decanted away from a viscous semi-plastic residue. This aqueous layer when acidified with hydrochloric acid precipitates 10 grams of unreacted 4-hydroxycoumarin. The viscous semi-plastic residue, similar to that resulting when no catalyst is employed, is refluxed for one hour with 200 ml. benzol, cooled overnight at 0-5° C. and filtered. The residue is rinsed on the filter with 10-20 ml. of cold benzol, sucked as dry as possible and dissolved in 400 ml. of 5% sodium hydroxide solution at room temperature. The caustic solution is washed three times as follows: (1) 200 ml., (2) 100 ml., (3) 100 ml. of carbon tetrachloride, and then acidified to Congo red with hydrochloric acid to precipitate the "Warfarin." This "Warfarin" is filtered off, washed free of chlorides with water and dried.

Yield: 66 grams or 69% based on 4-hydroxycoumarin.

*Example 4.—0.5 mole per cent aniline*

This example is the same as Example 1 except that 0.16 gram of aniline is used as the catalyst instead of 3.4 cc. of triethylamine.

Yield: 77 grams or 81% of theory based upon 4-hydroxycoumarin.

*Example 5.—50 mole per cent aniline*

Into a one-liter flask equipped with stirrer and reflux condenser are charged 50 grams (0.304 mole) of 4-hydroxycoumarin (M. P. 212-214° C.), 50 grams (0.342 mole) of benzalacetone (congealing point 37-38° C.), 350 ml. of water and 15.5 grams (0.152 mole) of aniline. The mixture is refluxed for 6 hours. As in Example 3 the resultant gummy residue is boiled in 200 ml. of benzol for one hour. Upon cooling for 7 days at 0-5° C. no product is precipitated even after seeding with "Warfarin."

Yield: None.

MODIFIED PROCEDURE

*Example 6.—40 mole per cent of tributylamine*

Into a one-liter flask equipped with stirrer and reflux condenser are charged 50 grams (0.304 mole) of 4-hydroxycoumarin (M. P. 212-214° C.), 50 grams (0.342 mole) of benzalacetone (congealing point 37-38° C.), 350 ml. of water and 23 grams (0.122 mole) of tributylamine. The mixture is refluxed for 3.5 hours with agitation, cooled overnight at 5-10° C. and the supernatant liquor decanted away from the gummy residue. This gummy residue is refluxed with 200 ml. of benzol and cooled whereupon no precipitate develops. The benzol solution is washed with about 120 ml. of 3% hydrochloric acid to precipitate the "Warfarin" which is filtered off and further purified as in Example 1.

Yield: 67.5 grams or 71% of theory based upon 4-hydroxycoumarin.

MODIFIED PROCEDURE

*Example 7.—5 mole per cent tributylamine*

Into a one-liter flask equipped with stirrer and reflux condenser are charged 50 grams (0.304 mole) of 4-hydroxycoumarin (M. P. 212-214° C.), 50 grams (0.342 mole) of benzalacetone (congealing point 37-38° C.), 350 ml. of water and 2.85 grams (0.0152 mole) of tributylamine. The mixture is treated as in Example 1 to isolate a crude condensation product. This is refluxed in 200 ml. of benzol, cooled and washed with about 30 ml. of 3% hydrochloric acid solution. The solids are filtered off from this acid-benzol mixture and purified with carbon tetrachloride as in Example 1.

Yield: 72 grams or 76.6% of theory based upon 4-hydroxycoumarin.

Several other amines belonging to this broad class of catalysts have been tested by this procedure and have been found to be operative. The comparative yields are shown in Table I.

TABLE I

| Catalyst | Moles Cat. per Mole 4-OH-coumarin | Yield Percent of Theory |
|---|---|---|
| Pyridine | 5 | 48 |
|  | 100 | 79 |
|  |  | 42 av. |
| Aniline | 0.5 | 81 |
|  | 2.5 | 85 |
|  | 5.0 | 90 |
|  | 15.0 | 55 |
|  | 50.0 | None |
|  | 150.0 | None |
| Triethyl amine | 0.5 } Experiment 1 | 76 |
|  | 2.5 | 81 |
|  | 5.0 | 86 |
|  | 7.0 | 83 |
|  | 15.0 | 82 |
|  | 40.0 } Experiment 2 | 59.4 |
|  | 50.0 | 52.6 |
|  | 50.0 } Experiment 1 | 69 |
|  | 55.7 | None |
| Tributyl amine | 5.0 | 75.6 |
|  | 40.0 | 71.0 |
| Triethanol amine | 5.0 | 79.0 |
| Piperidine | 5.0 | 86.5 |
| Diethyl amine | 5.0 | 82.5 |
| Diethanol amine | 5.0 | 82.5 |
| Monoethanol amine | 5.0 | 81.0 |
| Ammonia | 5.0 | 75.0 |

It will be seen that starting from the known condensation process in which water was the sole reaction medium and a yield of only 48% of condensation product was obtained which is in agreement with the yield reported by M. A. Stahmann, M. Ikawa and K. P. Link quoted above, the addition of 5% pyridine to the aqueous reaction medium raised the yield steeply to a peak at 79%, after which it dropped back to 42% when pyridine was the sole reaction medium as described in literature. All of the other catalysts behaved likewise. Table I clearly shows that with the addition of as little as 0.5–5.0% of the catalysts to the aqueous reaction medium, yields of from 76–90% or from 58–87% higher than the known yields, were obtained by the improved condensation process herein described and claimed. It is apparent, therefore, that with our method, the yields reach an optimum in the presence of practical amounts of the various catalytic amines. At that point, the yields are uniformly better and substantially higher than those of the known methods, throughout the entire range of these nitrogenous catalysts.

The increase in yield secured by our improved method over the yield reported by Seidman et al., employing piperidine in dioxane, is about 29%. Thus, the present method is a substantial improvement over the dioxane method in several respects in that it uses a less expensive, safer and more convenient solvent, and raises the yield.

Our improved procedure, utilizing water and an ammonia or an organic amine reaction medium, is applicable to the preparation of substituted 3-($\alpha$-phenyl-$\beta$-acetylethyl)-4-hydroxycoumarins by the condensation of derivatives of 4-hydroxycoumarin and of benzalacetone. Likewise, the purification step is applicable to any condensation product of 4-hydroxycoumarin and benzalacetone or related compounds containing an unreacted portion of the benzalacetone.

This application is a continuation of our earlier applications, Serial Numbers 236,091 filed July 10, 1951, now abandoned, and 238,002 filed July 21, 1951, now abandoned, in which we have described and claimed the process set forth in Example 1 of the present application, including the purification of the crude condensation product by refluxing it with benzol, then dissolving it in 5% sodium hydroxide solution and precipitating it with hydrochloric acid. The use of triethanolamine, piperidine, diethylamine, aniline, diethanolamine, or monoethanolamine as catalyst in lieu of pyridine was demonstrated in these earlier applications.

What we claim is:

1. In the manufacture of 3-($\alpha$-phenyl-$\beta$-acetylethyl)-4-hydroxycoumarin by condensation of 4-hydroxycoumarin with benzalacetone the improvement which comprises: heating the reactants dispersed in water containing a compound selected from the group consisting of ammonia and organic amines.

2. The process of claim 1 wherein the organic amine is present in an amount up to 50 mole percent of the 4-hydroxycoumarin.

3. The process of claim 1 wherein the organic amine is present in an amount up to and including 15 mole percent of the 4-hydroxycoumarin.

4. The process of claim 1 wherein the organic amine is present in an amount of about 5 mole percent of the 4-hydroxycoumarin.

5. In the manufacture of 3-($\alpha$-phenyl-$\beta$-acetylethyl)-4-hydroxycoumarin by condensation of 4-hydroxycoumarin with benzalacetone the improvement which comprises: heating the reactants dispersed in water containing aniline in an amount of about 5 mole percent of the 4-hydroxycoumarin.

6. In the manufacture of 3-($\alpha$-phenyl-$\beta$-acetylethyl)-4-hydroxycoumarin by condensation of 4-hydroxycoumarin with benzalacetone the improvement which comprises: heating the reactants dispersed in water containing piperidine in an amount of about 5 mole percent of the 4-hydroxycoumarin.

7. The process of claim 1 wherein the organic amine is a trialkylamine.

8. The process of claim 1 wherein the organic amine is triethylamine.

9. In the manufacture of 3-($\alpha$-phenyl-$\beta$-acetylethyl)-4-hydroxycoumarin by condensation of 4-hydroxycoumarin with benzalacetone the improvement which comprises: heating the reactants dispersed in water containing triethylamine in an amount of about 5 mole percent of the 4-hydroxycoumarin.

10. The process of claim 1 in which the organic amine is an alkanolamine.

11. The process of claim 1 wherein the organic amine is an ethanolamine.

12. The process of claim 1 wherein the organic amine is diethanolamine.

13. In the manufacture of 3-($\alpha$-phenyl-$\beta$-acetylethyl)-4-hydroxycoumarin by condensation of 4-hydroxycoumarin with benzalacetone the improvement which comprises: heating the reactants dispersed in water containing ammonia.

14. In the manufacture of 3-($\alpha$-phenyl-$\beta$-acetylethyl)-4-hydroxycoumarin by condensation of 4-hydroxycoumarin with benzalacetone the improvement which comprises: heating the reactants dispersed in water containing ammonia in an amount of about 5 mole percent of the 4-hydroxycoumarin.

15. In the manufacture of 3-($\alpha$-phenyl-$\beta$-acetylethyl)-4-hydroxycoumarin by condensation of 4-hydroxycoumarin with benzalacetone the improvement which comprises: heating the reactants dispersed in water containing aniline.

DONALD F. STARR.
KARL K. HABER.

References Cited in the file of this patent

UNITED STATES PATENTS

| Number | Name | Date |
|---|---|---|
| 2,427,578 | Stahmann | Sept. 16, 1947 |